United States Patent Office 3,461,273
Patented Aug. 12, 1969

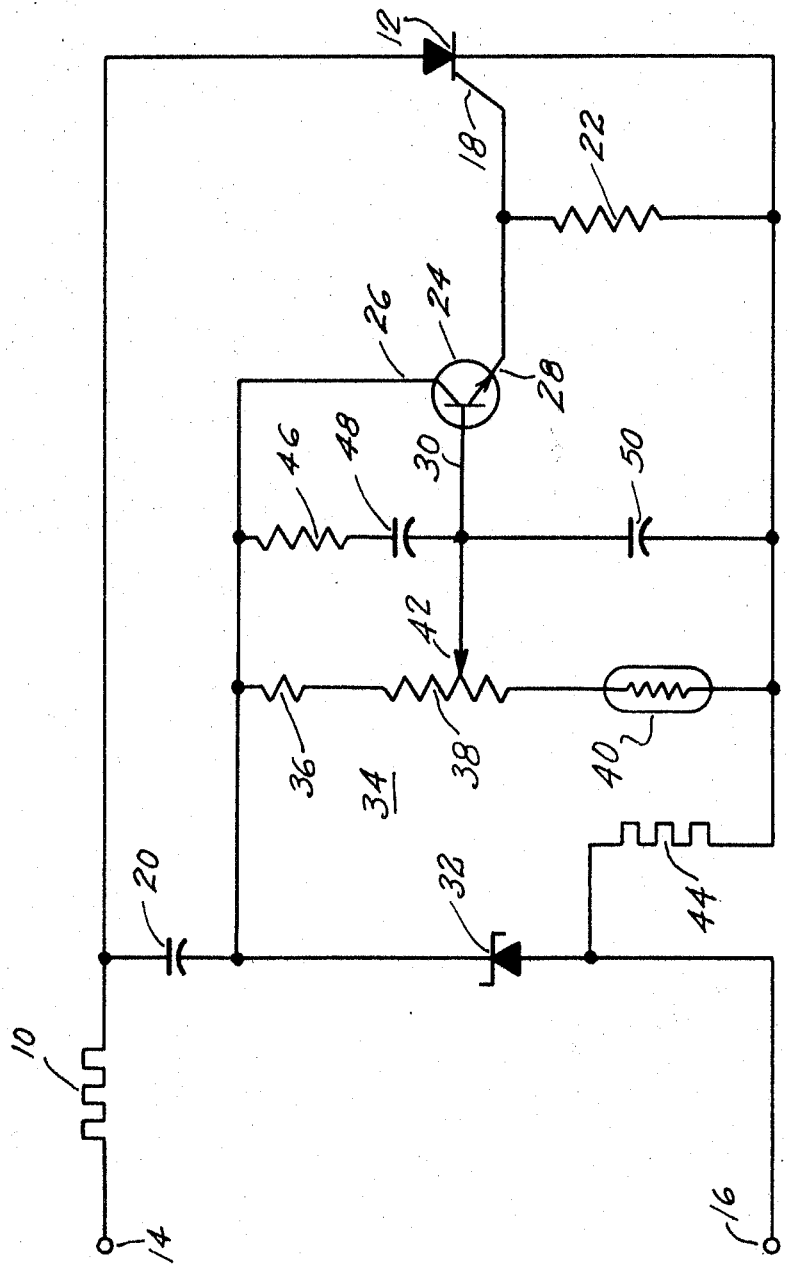

3,461,273
SOLID STATE CIRCUIT FOR CONTROLLING THE TEMPERATURE OF AN ELECTRIC APPLIANCE SUCH AS A BLANKET
Carrel Hilton Dykes, Bay Springs, Miss., assignor to Northern Electric Company, Chicago, Ill., a corporation of Delaware
Filed Aug. 24, 1966, Ser. No. 574,624
Int. Cl. H05b 1/02
U.S. Cl. 219—501                    16 Claims

ABSTRACT OF THE DISCLOSURE

A solid state circuit for controlling the conduction of current for an electric heater as used in blankets which has an SCR connected in series with a blanket heater and which has its control electrode connected to a biasing circuit comprising a capacitor and resistor in parallel with the voltage source and the biasing signal is controlled by a switching element such as a transistor which is biased by a voltage divider comprising a resistor and a thermister. A voltage reference diode is connected in series with a capacitor across the voltage terminal to regulate the amplitude of the voltage on the circuit.

The circuit provides a circuit which switches within a relatively small fraction of a cycle of the alternating current voltage after a zero crossing and thus eliminates radio frequency interference which is common with electric blankets.

---

This invention relates generally to a control circuit for an electrical heater and more particularly to a solid state circuit for controlling the conduction of current to an electric blanket heater.

The use of solid state controls for electric blankets presents many problems not readily foreseeable from the prior uses of solid state components and circuits. As a result, electromechanical controls are as yet considered superior to the solid state controls in many respects. However, electromechanical circuits also have a great number of disadvantages which may be overcome by the use of solid state components and circuits.

The electromechanical type control circuits generally employ switching elements which have movable contacts. One distinct disadvantage of this type of control circuit is that a large operating temperature differential must be maintained in order to extend the life of the current carrying contacts. In addition, each time the contacts are actuated to either open or close the circuit to the heater, transients are produced which cause radio interference.

Since the electromechanical type of control circuit employs components having moving parts, additional difficulties are encountered, such as the relatively short life of the moving parts due to wear, the fact that factory adjustment is required of the moving parts, particularly the spring elements, and the components are usually not highly shock resistant and, consequently, the life of the parts is considerably reduced due to the possibility of damage due to shock.

In addition, the electromechanical control circuits, because of the amount of mechanical components contained therein, require a considerable amount of tooling for producing the components and, consequently, large layouts of plant space and equipment is required.

One of the major problems involved with the electromechanical control circuits is that of radio interference caused by the opening and closing of the switch contacts. This problem, however, has not been eliminated by many of the solid state control circuits, since transients are still produced in the circuit when the voltage source is switched rather late in one of its cycles. That is, if the cyclic alternating voltage is switched considerably later in the cycle after a zero crossing thereof, transients will result which will produce radiated and conducted noise. This problem is especially evident in those control circuits which perform the switching at a predetermined phase angle of the alternating current source. For instance, one known method of controlling an electric blanket heater is that of switching the voltage source to the heater element at a predetermined phase angle, which phase angle is adjustable in accordance with the temperature of the heater element.

One type of solid state control circuit for electric blanket heaters employs a control element, such as an electronic switch, which is operative when conducting to disconnect the heater element from the voltage source. Therefore, power must be consumed by this element for a longer time period than that required if such element were operative only during the time that the voltage source was connected to the heater element. In addition, certain of my prior experimental solid state control circuits for electric blanket heaters were not sensitive to the degree desired.

Therefore, it is an object of the present invention to provide a solid state control circuit for a heater element which is operative to connect a voltage source to the heater element within a relatively small fraction of a cycle of the alternating current voltage after a zero crossing thereof.

Another object of the present invention is to provide a solid state control circuit for a heater element which produces no radiated or conducted noise for causing interference with other household devices, such as radios and televisions.

Still another object of the present invention is to provide a solid state control circuit for a heater element which is highly sensitive to changes in temperature of the heater element.

Still another object of the present invention resides in the provision of a control circuit for an electric blanket heater which requires no moving parts or mechanical elements.

A still further object of the present invention is to provide a solid state control circuit for a heater element wherein the control elements are operative only during the time that the voltage source is connected to the heater element.

A further object of the present invention is to provide a control circuit for an electric heater element which requires no factory adjustment of the components.

A still further object of the present invention is to provide a solid state control circuit for an electric heater element which is highly shock resistant.

A still further object of the present invention is to provide a solid state control circuit for an electrical heating element which does not require a large operating temperature differential for controlling the heater element.

An important feature of the present invention resides in the provision of a control circuit for biasing a switching element connected in series between the heater and the voltage source which produces the biasing signal within a relatively small fraction of a cycle of the alternating current voltage after a zero crossing thereof.

Another important feature of the present invention resides in the provision of an analogue element connected in series with the heater element and disposed for controlling the operating characteristics of the control circuit in response to the current flow through the heater element.

These and other objects, features and advantages are attained by a circuit for controlling the connection of a source of alternating current voltage to an electrical heating element which generally includes switching means for connecting the source to the heater and responsive to a biasing signal, a circuit for producing the biasing signal within a relatively small fraction of a cycle of the alternating current voltage after a zero crossing thereof, and a temperature responsive element for actuating the biasing circuit in response to a predetermined value of temperature.

The invention, as well as the above-mentioned objects, features and advantages thereof, will be more fully realized and understood from the following detailed description when taken in conjunction with the accompanying drawing wherein the single figure is a schematic diagram of a preferred embodiment of the present invention.

With reference to the drawing in detail, a heater element 10 of an electric blanket or the like is connected in series with a silicon controlled rectifier 12 to a source of alternating current voltage on the terminals 14 and 16. When the silicon controlled rectifier is biased for conduction, current flows through the heater element 10 and produces heat therein in accordance with the amount of current flow. Conduction of the silicon controlled rectifier 12 results upon the application of a biasing signal to a gate electrode 18 of the silicon controlled rectifier 12. This biasing signal is produced by a circuit including a capacitor 20 and a resistor 22 connected to the gate 18. As illustrated, the capacitor 20 and resistor 22 form a circuit connected substantially in parallel with the voltage source on the terminals 14, 16. Although the capacitor 20 is shown to be connected through the heater element 10 to the terminal 14, it is to be understood that the invention may be practiced by connecting the heater element 10 immediately adjacent the silicon controlled rectifier 12 so that the capacitor 20 is connected directly to the terminal 14.

The circuit including the capacitor 20 and resistor 22 produce a biasing signal of relatively high value on the gate electrode 18 of the silicon controlled rectifier 12 immediately following a zero crossing of a cycle of the alternating current voltage on the terminals 14, 16. This action results from the immediate current conduction at the start of such a cycle by the capacitor 20 which produces a relatively high value of biasing voltage across the resistor 22.

Application of the biasing signal to the gate electrode 18 of the silicon controlled rectifier 12 is controlled by a switching element or transistor 24. As illustrated, a collector electrode 26 of the transistor 24 is connected to the capacitor 20 and an emitter electrode 28 thereof is connected to the resistor 22. When a base electrode 30 of the transistor 24 is correctly biased with respect to the collector 26 and emitter 28, the transistor 24 will become conductive to allow current conduction through the capacitor 20 and resistor 22 for producing the biasing signal required at the gate electrode 18 of the silicon controlled rectifier 12 or the thyristor. The capacitor 20 and the resistor 22 therefore form a differentiating circuit. Therefore, the transistor 24 is employed as a switching element in series with the capacitor 20 and resistor 22 for controlling the application of a biasing hignal to the silicon controlled rectifier 12 for controlling the conduction thereof.

A Zener diode 32 is connected in series with the capacitor 20 across the voltage source on the terminals 14, 16. The Zener diode 32 regulates the amplitude of the voltage applied to the cathode thereof to a predetermined level. In one preferred form of the present invention, the Zener breakdown of the Zener diode 32 is preferably 10 volts.

Connected substantially in parallel with the Zener diode 32 is a voltage divider network 34 which generally includes a resistor 36, a potentiometer 38 and a temperature responsive resistor, such as a thermistor 40 having a negative coefficient of electrical resistivity, connected in series. A variable arm or wiper element 42 of the potentiometer 38 is connected to the base electrode 30 of the transistor 24.

A resistor 44, which is constructed to produce and transmit heat to its surroundings, is connected in series with the heater element 10 and the silicon controlled rectifier 12 and is disposed in close proximity in heat-transfer relationship to the temperature responsive resistor 40. The resistor 44 is preferably of a small resistance value in comparison to the resistance value of the heater element 10 so as not to affect the current conduction therethrough appreciably. The resistor 44 performs as an analogue with respect to the temperature of the heater element 10. That is, all of the current which passes through the heater element 10 and silicon controlled rectifier 12 also passes through the resistor 44 and the amount of heat produced in the heater element 10 by such current will be proportional to the heat produced by the resistor 44. Because of the value of the capacitor 20, any current through the heater element 10 which does not pass through the silicon controlled rectifier 12 will be of negligible amount and can be neglected for purposes of this description. As a result, all of the current flow through the heater element 10 will also pass through the resistor 44 and produce a proportional amount of heat therein.

The transistor 24 is biased into one of its respective states by the voltage applied to the base electrode 30 thereof. The voltage at the base 30 is determined by the voltage divider circuit 34 including the temperature responsive resistor 40 which is in heat conductive relationship with the analogue resistor 44. Therefore, as the temperature of the resistor 40 is altered by heat being conducted from the resistor 44, the voltage on the base 30 will change accordingly. That is, as the resistance of the resistor 40 is altered by heat being conducted thereto, the voltage drop thereacross will change accordingly to alter the voltage on the wiper arm 42 of the potentiometer 38 and, consequently, the voltage on the base 30 of the transistor 24.

A resistor 46 and capacitor 48 are connected in series with one another and in parallel with the resistor 36 and the upper portion of the potentiometer 38. In addition, a capacitor 50 is connected in parallel with the lower portion of the potentiometer 38 and the temperature responsive resistor 40. The resistor 46 and capacitors 48, 50 suppress transient conditions, thereby reducing radiated and conducted noise.

In operation, when the voltage source is first connected to the terminals 14, 16, the transistor 24 will be biased to a conductive state causing a current flow through the capacitor 20 and resistor 22 to produce a biasing signal on the gate 18 of the silicon controlled rectifier or thyristor 12. The silicon controlled rectifier 12 will then become conductive causing current flow through the heater element 10, the silicon controlled rectifier 12, and the analogue resistor 44. Current will only flow through this branch, however, during the positive half cycles of the voltage source due to the nature of the silicon controlled rectifier 12. At each zero crossing of the voltage source current in its positive half cycle, a transient current flow through the capacitor 20 will produce a negative biasing signal on the resistor 22 when the transistor 24 is conductive. Therefore, the silicon controlled rectifier 12 will remain conductive only during the time that the transistor 24 is conductive. When a sufficient amount of current has passed through the analogue resistor 44 to heat the temperature responsive resistor 40 to lower its resistance by a sufficient amount, the transistor 24 will become nonconductive due to the decrease in potential on the base 30 thereof and a positive biasing signal will not be developed across the resistor 22 and, consequently, the silicon controlled rectifier 12 will become nonconductive during positive half cycles, terminating current flow through the heater element 10. When the silicon controlled rectifier 12 becomes nonconductive, current will cease to flow through the analogue resistor 44 and the temperature responsive resistor 40 will cool off until its resistance has increased such that the voltage on the base 30 increases sufficiently to cause the transistor 24 to become conductive again.

The principles of the invention explained in connection with the specific exemplification thereof will suggest many other applications and modifications of the same. It is accordingly desired that, in construing the breadth of the appended claims they shall not be limited to the specific details shown and described in connection with the exemplification thereof.

I claim as my invention:

1. A control circuit for an electrical heater element comprising
    (a) switching means connected in series with the heater element and a source of alternating current voltage,
    (b) means for biasing said switching means to provide current conduction through the heater element including
        (1) circuit means for producing a biasing signal within a relatively small fraction of a cycle of the alternating current voltage after a zero crossing thereof,
        (2) a switch connected between a point in said circuit means and said switching means, and
        (3) temperature responsive means connected to said switch for actuation thereof in accordance with the temperature thereof.

2. A control circuit as defined in claim 1, wherein said circuit means includes a capacitor and a resistor connected in series with said switch across said voltage source, said resistor being connected to said switching means and applying the biasing signal thereto upon actuation of said switch.

3. A control circuit as defined in claim 2, including means for producing a substantially constant DC-voltage across said resistor.

4. A control circuit for an electrical heater element comprising, switching means connected in series with the heater element and a source of alternating current voltage; and means for biasing said switching means to provide current conduction through the heater element including (1) circuit means for producing a biasing signal within a relatively small fraction of a cycle of the alternating current voltage after a zero crossing thereof, (2) a transistor connected as a switch between a point in said circuit means and said switching means, and (3) a voltage divider circuit connected to said switch for actuation thereof in accordance with the temperature thereof, and connected substantially in parallel with the source of voltage and having a temperature responsive variable resistor therein, and a tap of said voltage divider circuit being connected to a base of said transistor.

5. A control device as claimed in claim 4, including means connected to the base of said transistor for suppressing transients.

6. A control device as claimed in claim 5, in which said suppression means comprises:
    (a) a resistor and a capacitor connected in series with each other, one end thereof being connected to said base, and the other end thereof being connected to one end of said voltage divider circuit, and
    (b) a capacitor connected between said base and the other end of said voltage divider circuit.

7. A control circuit as defined in claim 4, wherein said temperature responsive means includes an analogue resistor arranged to be connected in series with the heater and in heat-transfer relation to said temperature variable resistor.

8. A control circuit as claimed in claim 4, in which said temperature variable resistor has a negative coefficient of electrical resistance.

9. A control circuit for an electrical heater element comprising,
    (a) switching means connected in series with the heater element and a source of alternating current voltage; and
    (b) means for biasing said switching means to provide current conduction through the heater element including
        (1) a capacitor and a first resistor for producing a biasing signal within a relatively small fraction of a cycle of the alternating current voltage after a zero crossing thereof,
        (2) a transistor having a collector and an emitter connected in series with the capacitor and first resistor and connected as a switch between said switching means and capacitor and first resistor, and
        (3) a voltage divider circuit including a thermistor connected in series with said capacitor and to said switch for actuation thereof in accordance with the temperature thereof, a tap of said voltage divider circuit being connected to a base electrode of said transistor.

10. A control circuit as defined in claim 9, wherein said switching means includes a thyristor having a gate electrode and a cathode electrode, said first resistor being connected between said gate and said cathode electrodes.

11. A control circuit as defined in claim 9, wherein said temperature responsive means further includes an analogue resistor arranged to be connected in series with the heater and in heat-transfer relation to said thermistor.

12. A control circuit as defined in claim 9, including a Zener diode connected across said first resistor.

13. A control circuit having the structure set forth in claim 4, including means for producing a substantially constant DC-voltage across said voltage divider circuit.

14. A control circuit having the structure set forth in claim 1, wherein said switching means includes a thyristor having a gate electrode and a cathode electrode, and wherein said circuit means includes a resistor connected between said gate and said cathode electrodes.

15. A control circuit for an electrical heater element comprising
    (a) switching means connected in series with the heater element and a source of alternating current voltage,
    (b) means for biasing said switching means to provide current conduction through the heater element including
        (1) circuit means for producing a biasing voltage including means for advancing the phase of the biasing voltage with respect to the phase of the voltage of the source,
        (2) a switch connected between a point in said circuit means and said switching means, and
        (3) means for detecting a temperature change of the heater element and connected to said switch for actuation thereof in accordance with the temperature of the heater element.

16. A control circuit as defined in claim 15, wherein said phase advancing means includes a capacitor.

References Cited

UNITED STATES PATENTS

| | | | |
|---|---|---|---|
| 3,211,214 | 10/1965 | Chambers | 219—501 |
| 3,385,958 | 5/1968 | Lauck | 219—501 |
| 3,374,337 | 3/1968 | Burley | 219—501 |

BERNARD A. GILHEANY, Primary Examiner

F. E. BELL, Assistant Examiner